United States Patent [19]

Zuchtriegel

[11] 4,398,126
[45] Aug. 9, 1983

[54] PROTECTED LOW-PRESSURE DISCHARGE LAMP OPERATING CIRCUIT

[75] Inventor: Anton Zuchtriegel, Taufkirchen, Fed. Rep. of Germany

[73] Assignee: Patent-Truehand-Gesellschaft fur Elektrische Gluhlampen GmbH, Munich, Fed. Rep. of Germany

[21] Appl. No.: 352,784

[22] Filed: Feb. 26, 1982

[30] Foreign Application Priority Data

Mar. 30, 1981 [DE] Fed. Rep. of Germany ....... 3112499

[51] Int. Cl.³ .......................................... H01T 13/02
[52] U.S. Cl. .................. 315/127; 315/121; 315/201; 315/209 R; 315/211; 315/244
[58] Field of Search .............. 315/127, 119, 121, 201, 315/209 R, 210, 211, 244

[56] References Cited

U.S. PATENT DOCUMENTS

| | | | |
|---|---|---|---|
| 1,778,416 | 10/1930 | Buttolph | 315/127 |
| 3,345,538 | 10/1967 | Peterson | 315/127 |
| 4,008,414 | 2/1977 | Agnew | 315/210 |
| 4,045,711 | 8/1977 | Pitel | 315/209 R |

Primary Examiner—Harold A. Dixon

Attorney, Agent, or Firm—Frishauf, Holtz, Goodman & Woodward

[57] ABSTRACT

A fluorescent lamp control circuit which provides power at high frequency, for example in the order of 35 kHz, includes a push-pull oscillator circuit having two transistors (T1, T2), an inductance element (L1, L1'), and a capacitor (C1, C1') to supply the lamps (3, 3'). To prevent dangerous high voltages upon removal of the lamp load, connected to the oscillatory circuit and to the series resonance circuit, upon removal of failure of a lamp, a protective circuit is provided formed by a thyristor (TH) connected to short-circuit at least one of the transistors (T1) of the oscillatory circuit. Control energy is derived directly from the high-voltage supply by a rectifier (D1, D1') connected to the inductance (L1, L1') of the series resonance circuit, so that sufficient and reliable switching energy for the protective thyristor (TH) is always available, the firing criterion therefor being determined by the breakdown voltage of a breakdown element such as a diac (22) connected to a voltage divider (20, 21) and receiving its control voltage also from the high-voltage connection of the series resonance circuit (4) including the inductance, which also feeds the power supply capacitor (C3) for the thyristor (TH).

14 Claims, 3 Drawing Figures

PROTECTED LOW-PRESSURE DISCHARGE LAMP OPERATING CIRCUIT

Reference to related applications, assigned to the assignee of this invention, the disclosure of which is hereby incorporated by reference:

U.S. Ser. No. 193,254, filed Oct. 1, 1980, by the inventor hereof; and

U.S. Ser. No. 352,781, filed Feb. 26, 1982, by the inventor hereof "RAPID-START, LOW-PRESSURE DISCHARGE LAMP OPERATING CIRCUIT".

The present invention relates to a discharge lamp operating circuit, for example to an operating circuit for a fluorescent lamp, capable of use with one or more fluorescent lamps, and which utilizes a self-oscillating push-pull switch having two transistors.

BACKGROUND

The referenced application Ser. No. 193,254, of Oct. 1, 1980, by the inventor hereof, discloses a circuit of this type having two similarly poled switching transistors which are connected to bridge the terminals of a direct current supply source. If more than one lamp is operated in such a system, each one of the lamp operating circuits has its own series resonance circuit which is formed by respective ballast inductances and a capacitor. The respective lamp operating circuits and the associated series resonance circuits are connected in parallel.

The referenced application discloses a system which is suitable both for single-lamp as well as for multiple-lamp operation which includes a protective circuit so that, in case of malfunction for example upon non-firing or starting of a lamp, the transistor push-pull switch is disconnected, so that damage to the lamps or to the system is prevented. Preferably, the protective circuit includes a thyristor which is connected to the base of one of the transistors-for example one which is connected to the positive terminal of the direct supply, and then to the negative terminal of the direct voltage supply.

The protective circuit as described in the referenced application Ser. No. 193,254 provides operating voltages for the disconnect transistor solely from the filter capacitor of the d-c supply. This, for example, is an electrolytic capacitor. Such a filter capacitor is connected to the network filter circuit of the bridge rectifier. It has been found that the voltage on the filter capacitor changes with loading, and thus the switching function of the thyristor will depend on loading on the lamp. In case of malfunction, the direct current supply is loaded to a greater extent so that, if load interruption should cause such higher loading, which is frequently the case when the disconnect thyristor must become operative, the switching conditions under which the disconnect thyristor operates is impaired due to the lower holding current available therefor.

The drop in voltage on the filter capacitor of a direct supply network is due to the current limiting effect of the filter choke which is provided to remove ripple from the network supply. The filter capacitor is capable of supplying increased current into the circuit for a short period of time without substantial drop in voltage upon shedding of load during normal operating conditions, that is, still within the response period of the protective circuit. Consequently, the switching conditions are usually suitable for emergency switching. If, however, switching conditions occur, for example if one lamp is not connected or not properly connected during initial connection of the entire unit, no charge with increased voltage can build up on the filter capacitor so that, then, the protective circuit may not be able to respond due to insufficient energy supply thereto.

THE INVENTION

It is an object to improve the circuit described in the aforementioned referenced application Ser. No. 193,254, suitable both for single-lamp as well as for multiple-lamp operation, by improving the protective circuitry therefor so that it will reliably respond regardless of operating conditions of the lamp and/or the auxiliary circuit.

Briefly, a separate capacitor is provided to supply operating power for the disconnect thyristor. The separate disconnect capacitor receives its power from a rectifier circuit deriving, in turn, energy from the ballast inductances.

The voltage supply in accordance with the invention has the advantage that, upon interruption of a load, high voltage peaks will result due to the formation of a series resonance circuit formed by the ballast inductances and the operating capacitors of the network, so that particularly good circuit conditions will obtain leading to switching of the disconnect thyristor. This increased voltage in the series resonance circuit can be used as a disconnect criterion for the thyristor itself so that separate control windings necessary to trigger firing of the thyristor need not be provided. Such additional control windings were usually applied to the ballast inductances.

Figure 1:
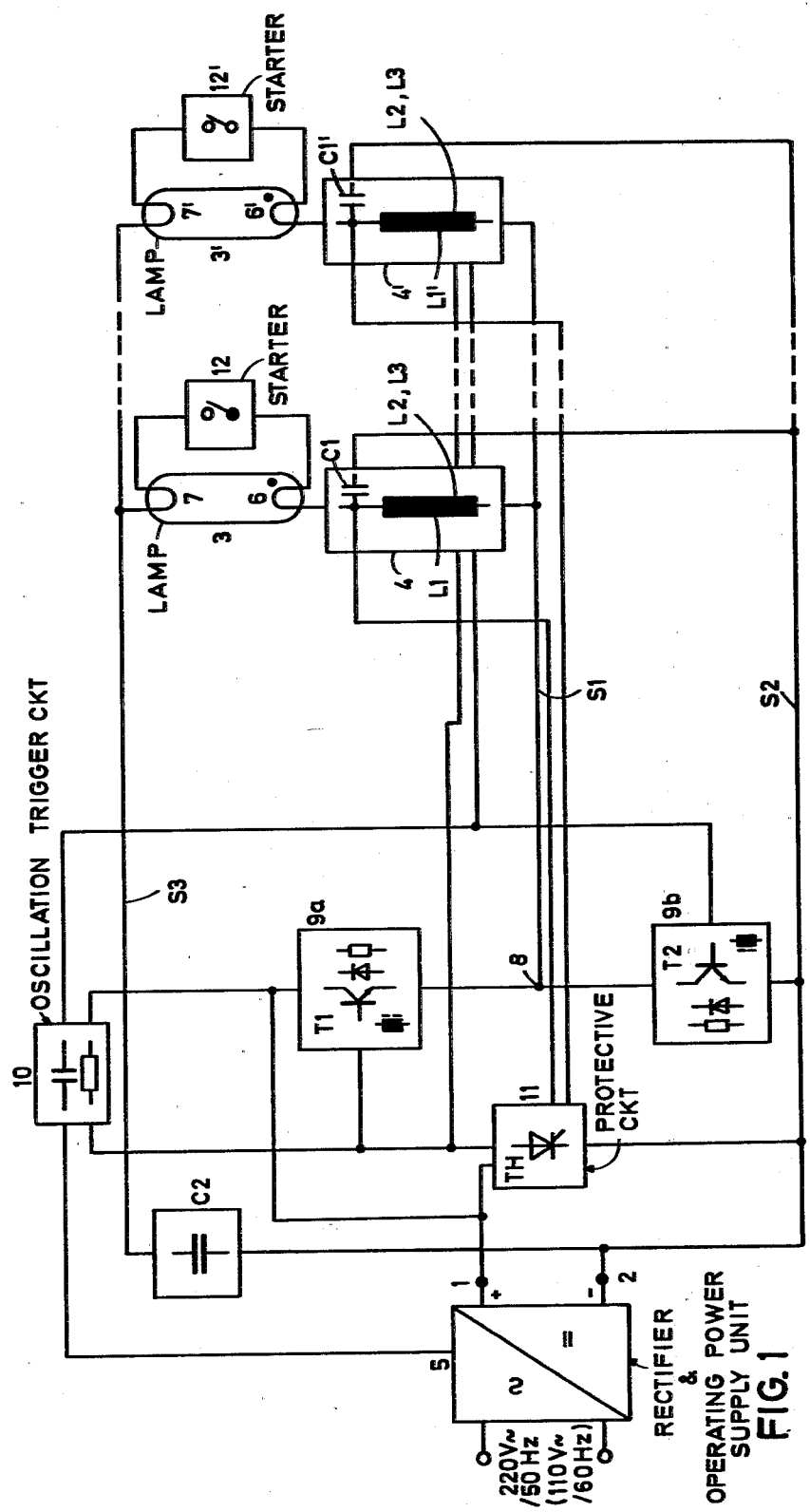
FIG. 1 is a general block circuit diagram of the lamp and circuit system.

Referring to FIG. 1 showing the general principle of the power system for two lamps 3, 3': Terminals 1, 2 provide direct current power. They are connected through the collector-emitter paths of two serially connected similarly poled high-voltage switching transistors T1, T2. The transistor circuit operates as a self-oscillating push-pull oscillator to supply power at a frequency substantially elevated above that of power line frequency of low-pressure discharge lamps 3, 3', for example standard fluorescent lamps. Any desired number of lamps may be supplied from the power supply unit upon suitable dimensioning of the components thereof. Each one of the lamps has its own ballast inductance L1, L1' and is coupled to its own individual series resonance circuit 4, 4', which includes the respective inductance L1, L1' and a capacitor C1, C1', respectively. The respective lamp operating circuits and the associated series resonance circuits are all connected in parallel. If only a single lamp is to be operated from the system, only a single accessory circuit 4 with the resonance circuit L1, C1 is associated with the single lamp.

Optimum operation is obtained if the d-c voltage supply has a ripple of not over about 20%. The transistor push-pull circuit formed by transistors T1, T2 is supplied with d-c power from a rectifier 5. The rectifier 5 is connected to any suitable power supply network, for example 220 V/50 Hz or, for example, 110 V/60 Hz.

The rectifier 5 preferably is constructed as a bridge rectifier and includes a filter capacitor as well as a network ripple filter. When supplied, for example, with 220 V network voltage, it provides at output terminals 1, 2 a d-c voltage of about $\sqrt{2}\cdot 220$ V. For operation with 110 V/60 Hz, the rectifier preferably includes a symmetrical voltage doubler circuit and, if needed, a filter network to remove network voltage ripple. The transistor push-pull switches T1, T2 apply only half the voltage to the respective lamp operating circuits, with alternating polarity. The series resonance circuits 4, 4' provide a substantially higher voltage to the respective lamps 3, 3', particularly during starting. They also supply a sufficiently high operating voltage for continuous operation of the lamps 3, 3'.

The system can also be used for direct connection to a d-c network (not shown). The rectifier and operating supply unit 5 then is not needed.

Figure 2:
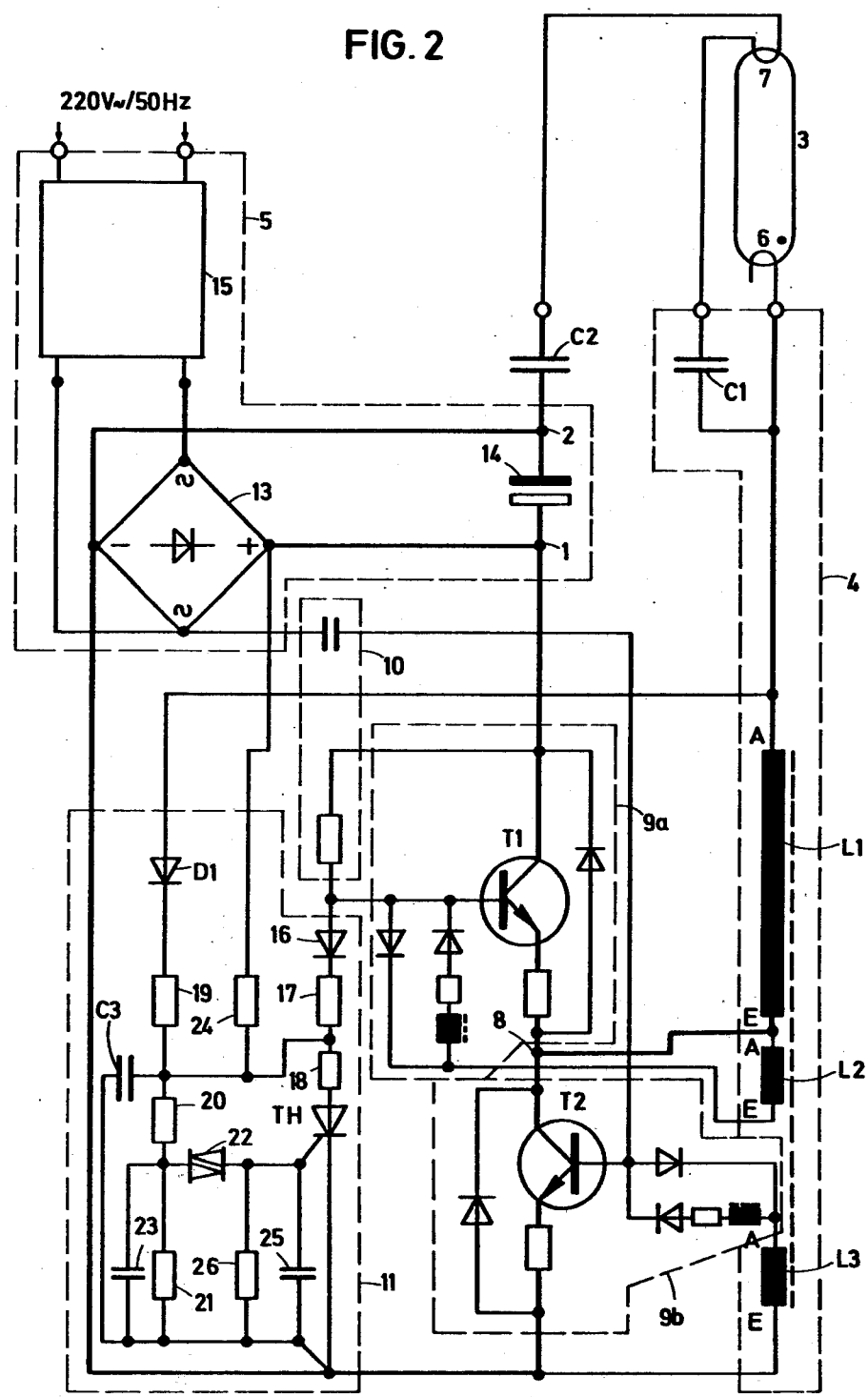
FIG. 2 is a circuit diagram of an embodiment of the invention for single-lamp operation.
Figure 3:
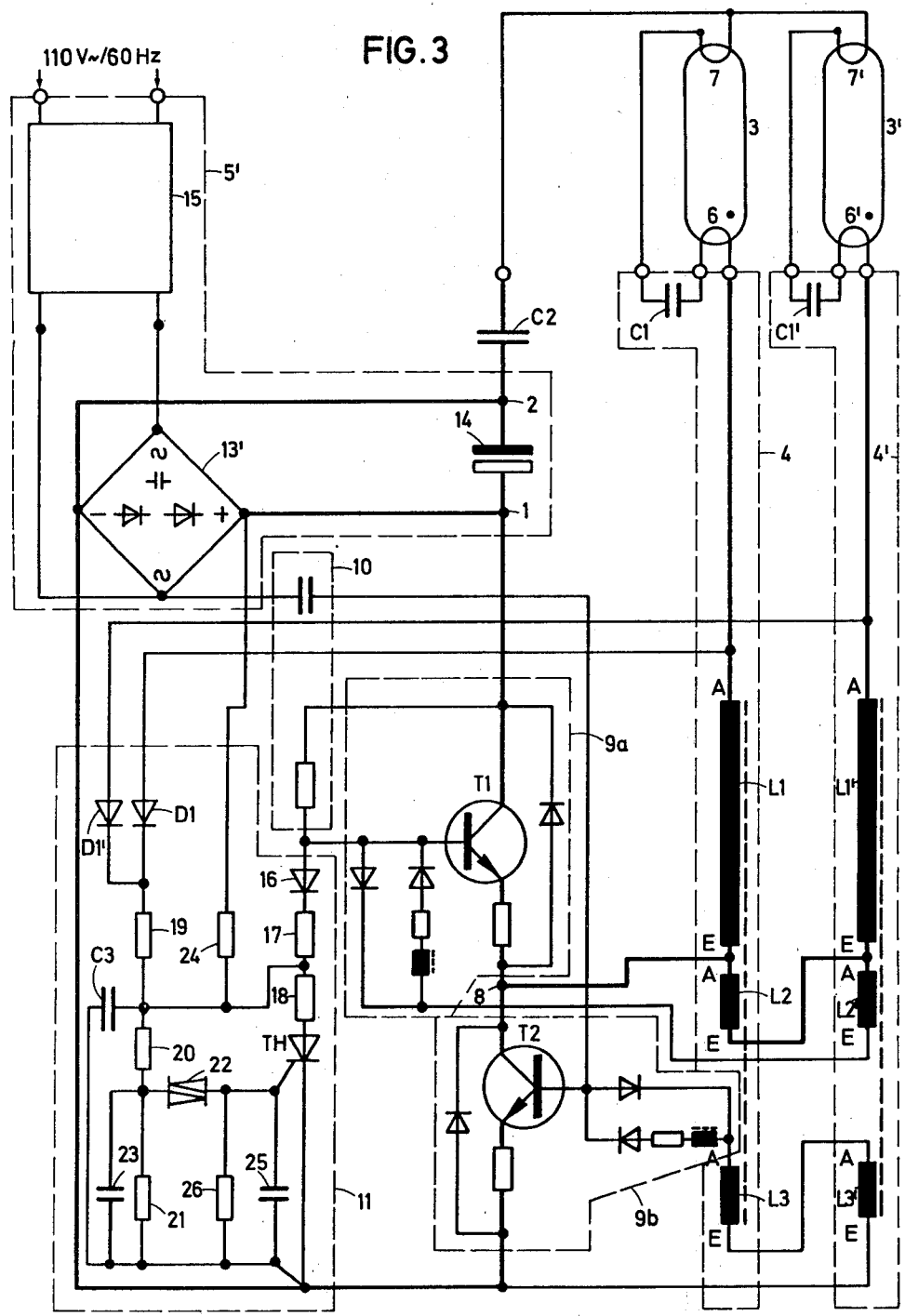
FIG. 3 is a circuit diagram of an embodiment for multiple-lamp operation.

The first electrodes 6, 6' of the lamps 3, 3' are connected through the respective ballast inductances L1, L1' or, rather, the resonant-tuned circuit inductances, to a common supply bus S1 which is connected to the center tap or junction 8 between the two transistors T1, T2 of the push-pull switching system. The electrodes 6, 6' of the lamps 3, 3' are additionally connected to the oscillating capacitors C1, C1' which, in turn, are connected to a common bus S2 which is connected to one terminal, as shown to the negative terminal 2 of the d-c supply source formed by the rectifier and operating supply unit 5. The arrangement may be varied, and modified arrangements and positions of the oscillating capacitors C1, C1' are shown in FIGS. 2 and 3, to be described in detail below. The second electrodes 7, 7' of the lamps 3, 3' are connected to a common bus S3, which is in turn connected through a capacitor C2 of relatively high capacity to the aforementioned bus S2, in this case the negative bus of the d-c power supply unit 5. The capacitor C2 has at least 50 times the capacity value of the oscillating capacitors C1, C1'. Consequently, the common bus S3 is practically at center voltage with respect to d-c supply voltage. The lamps 3, 3' are supplied with alternating power of a frequency which is within the audio or high-frequency range. The impedance of the capacitor C2 is extremely low at the operating frequency. The capacitor C2 acts only as a reactive power load or impedance element. The oscillating frequency of the transistor oscillator is determined by the series resonant oscillating circuit 4, 4'. The respective lamps 3, 3' form the damping load for the respective oscillating circuits.

The inductances of the oscillating circuits provide control energy for the switching transistors T1, T2 of the push-pull circuit over additional control windings. Control windings L2, L2', and L3, L3' are inductively coupled with the inductances L1, L1' and connected over a network formed by rapid switching diodes, resistances, and inductances with the bases of the respective switching transistors T1, T2. The control networks for the transistors T1, T2 are shown only schematically in FIG. 1, and collectively by block 9a, 9b.

Starting of the transistor oscillator is effected by a start oscillating circuit 10 which triggers transistor T2, that is, the transistor which is connected to the negative terminal 2 of the power supply, by providing a trigger voltage to the base thereof. When the switching transistor T2 is rendered conductive by a pulse from the trigger circuit 10, the oscillating circuits 4, 4' will start to oscillate, and the feedback currents maintain oscillation of the push-pull oscillator T1, T2.

The operation of the trigger circuit 10 is described in detail in referenced application Ser. No. 352,781, by the inventor hereof, filed concurrently herewith, entitled "RAPID-START, LOW-PRESSURE DISCHARGE LAMP OPERATING CIRCUIT".

The series resonance circuits 4, 4' operate stably and with low inherent or internal losses as long as a lamp 3, 3' is connected as a load and absorbs energy. The oscillating circuits 4, 4' must be so damped that the switching transistors T1, T2 are suitably controlled. Upon interruption of a load, for example if a lamp is to be exchanged, the voltage rises rapidly, and substantial losses will result within the accessory apparatus. Unless precautions are taken, the accessory apparatus may be damaged or destroyed. To prevent destruction, a protective circuit 11 is provided which disconnects the transistors T1, T2 rapidly, for example in about ½ second or less, after an interruption in normal operation occurs. Simultaneously, upon removal of one of the lamps 3, 3', for example, from the lamp socket, disconnection of the transistors T1, T2 prevents dangerously high voltages from occurring at the lamp sockets. The protective circuit 11 includes a controlled switching element TH, for example a thyristor, which is connected in the connection line between the base of the switching transistor T1, that is, the transistor connected to the positive terminal 1 of the d-c operating power supply unit, and the negative terminal 2 thereof.

The present invention is directed to the specific network of the protective circuit 11, and control of the controlled switching element TH, and will be described below with reference to FIGS. 2 and 3.

The resonance capacitors C1, C1' will have a high voltage when the lamps 3, 3' are not yet ignited or have not yet fired. This high voltage is also the idling voltage for the lamp. Due to this high voltage, the lamps 3, 3' will be of the "rapid-start" type, thus will fire or illuminate without preheating of the electrodes. The lamps, thus, are cold-starting. In order to insure reliable switching, starter switches 12, 12' may be supplied which bridge the lamps 3, 3' when the network voltage is first connected in order to preheat the electrodes 6, 7; 6', 7', as well known. The starter switches 12, 12', after the lamps have been preheated, will open and thus insure firing. The switches 12, 12' may be rapid-switching four-layer diodes, starter switches with a glow element, which have a high glow current, and which prevent ignition of the lamp unless the electrodes 6, 7; 6', 7' have been preheated. Thus, the system can be used both with rapid-start cold-firing, as well as with starter-type lamp circuits. Network arrangements which by suitable connection of the capacitors C1, C1' permit elimination of the starter switches 12, 12' are shown in FIGS. 2 and 3.

General circuit arrangement of FIGS. 2 and 3: The rectifier and operating power supply unit 5 provides operating power for one (FIG. 2) or two (FIG. 3) fluorescent lamps 3, 3' of 50 W, 1.5 m length, having a firing or ignition voltage of over 800 V. The operating frequency for the lamps is 35 kHz, and each one of the lamps, including accessory equipment, have a power consumption of 56 W, so that, for two-lamp operation together with the circuits (FIG. 3), 112 W load will be placed on the power network. The rectifier operating power supply unit 5 is shown in FIG. 2 as a bridge rectifier 13 to which a large network filter capacitor 14 is connected. A filter network 15 protects the network against high-frequency and excessively high current peaks or needle pulses. FIG. 3 illustrates a rectifier and operarting power supply unit 5', adapted for connection to 110 V/60 Hz, which has a voltage doubler circuit 13', a network high-frequency filter protective circuit 15, and a filter capacitor 14.

FIGS. 2 and 3, further, show different possibilities for connection of the capacitors C1, C1' of the series resonance circuits 4, 4'.

The control windings L2, L2' and L3, L3' are so subdivided that each one of the control circuits has to supply, for n lamps, only the n-th portion of the control energy. Thus, for one-lamp operation (FIG. 2) the entire control energy must be supplied by the coils L2, L3; for multiple-lamp operation, for example two-lamp operation, the windings L2, L2', L3, L3' need supply only ½ or, generally, 1/n of the control energy. The summation of the voltage components optimally should be so high that the switching transistors T1, T2 are controlled into at least quasi-saturation. The control windings L2, L2' and L3, L3' for the respective switching transistors T1, T2 are galvanically separated from each other. If more than one lamp is to be operated—see FIG. 3—the respective inductances L2, L2'; L3, L3' are serially connected in a group of series circuits which bridge the base-emitter path of the respective switching transistor T1, T2. If only a single lamp is used, only the control windings L2 and L3 are coupled with the ballast inductance L1—see FIG. 2.

The control networks 9a, 9b (FIG. 1) of the switching transistors T1, T2 receive their energy from the windings L2, L2' and L3, L3' on the inductances L1, L1', respectively.

The exact construction and function of the control networks 9a, 9b is described in detail in the referenced application Ser. No. 352,781, filed Feb. 26, 1982, by the inventor hereof, entitled "RAPID-START, LOW-PRESSURE DISCHARGE LAMP OPERATING CIRCUIT" which also describes in detail the oscillation trigger circuit 10.

In accordance with a feature of the present invention, the protective network 11 receives its power supply from the high-voltage portion of the network, preferably over an individual charge and power capacitor C3 (FIGS. 2, 3) which is connected to receive its charge over a rectifier circuit, for example formed by diodes D1, D1' connected to the high-voltage supply of the network.

The basic element for the protective circuit 11 is a controlled semiconductor switch, as shown and preferably a thyristor TH (FIGS. 2, 3), connected to be polarized for conduction to the negative terminal 2. The anode of thyristor TH is connected through current limiting resistors 17, 18 to a diode 16 which is connected to the base of the transistor T1.

In accordance with a feature of the invention, the ignition and turn-off energy for the thyristor TH is derived from a separate capacitor C3 which is connected in parallel to the thyristor TH or, rather to the tap or junction point between the resistors 17, 18. The capacitor C3, which may have a value of between 0.5 and 1 μF, is provided to supply d-c voltage and energy for the thyristor TH when the thyristor is to be rendered conductive. The direct parallel connection of the capacitor C3 with the thyristor TH—as shown via the current limiting resistor 18—reliably prevents high-frequency voltage loading of the thyristor TH and consequent possible damaging and undesired stray high-frequency triggered firing.

Charging energy for the capacitor C3, in accordance with a feature of the invention, is derived from the high-voltage operating network of the circuit. High-voltage rectifier diodes D1 and D1' (FIGS. 2, 3) are used. The high-voltage rectifier diodes D1, D1' have to be designed to accept the highest possibly arising voltage peaks, that is, for a peak value of greater than 2 kV, and reliably block even under such high-voltage peaks. The diodes D1, D1' are poled for conduction in the same direction as the thyristor TH. Their anodes are connected to the junction between the ballast inductance L1, L1', respectively, and the series tank circuit capacitor C1, C1'. The cathodes of the diodes are connected in parallel. The junction of the cathodes is connected over a charge resistor 19—for current limiting—directly to the terminal of the capacitor C3 which is also connected in parallel with the thyristor TH, that is, to the anode of the thyristor, through the resistor 18.

The thyristor control circuit, which is supplied by the capacitor C3 from high-volage d-c, includes a voltage divider 20, 21 connected in parallel to the capacitor C3. The voltage division ratio is so selected that, in ordinary normal operation, the voltage across resistor 21 is below the breakdown voltage of a diac 22. The gate or control electrode of the thyristor TH is connected through the diac 22 to the junction between the resistors 20, 21, that is, to the tap point of the voltage divider. The diac 22 provides for the switching characteristics, and changeover between normal operation and excess voltage, that is, operation with the load (the lamp) removed. When the breakdown voltage of the diac 22 is reached, diac 22 becomes conductive and fires thyristor TH. Firing or ignition energy for the diac is supplied by a capacitor 23 connected in parallel to the resistor 21 which, together with the resistor 20, forms a timing circuit providing for some time delay prior to response of the protective circuit. The dimensioning of the timing circuit 20, 23 is so selected that response of the thyristor TH is reliably inhibited during the igniting phase of the lamp. For normal lamp operation, and also during normal lamp ignition time, the trigger threshold for the thyristor is not reached.

Let it be assumed that one of the lamps is removed, or fails, or there is a circuit interruption. Upon removal of the lamp, that is, removal of the load on the circuit, the capacitor C3 will charge, although the voltage at the filter capacitor 14 of the power rectifier drops, since the capacitor C3 will be charged over the rectifier network D1, D1' directly from the high-voltage terminal of the inductance. If only one-lamp operation is used, only one of the rectifier diodes D1 will be supplying high voltage. The capacitor C3, thus, will be charged to a higher voltage through the charge resistor 19, serially connected with the diode D1, and D1', respectively, for multiple-lamp operation. This circuit, thus, utilizes the high voltage increase on the series resonance circuit 4, or 4', respectively, which occurs if the resonance circuit is undamped, a situation pertaining upon removal of the load formed by the lamp. The increase in voltage at the capacitor C3 then reliably will trigger the thyristor TH as soon as the breakdown voltage of diac 22 is reached, thus firing the thyristor. When the thyristor has fired, the base of the transistor T1 will no longer receive control energy since the base will, effectively, be granted. Transistor T1 will block and, consequently, the oscillatory circuit 4, 4' will be deenergized.

A resistor 24 is provided, connecting the thyristor TH with the positive terminal 1 of the d-c voltage supply. The thyristor TH, thus, will continue to receive power, and therefore will remain conductive since it will have holding current flowing therethrough. This prevents renewed oscillations from starting. Diode 16 blocks the alternating voltage from the anode circuit of the thyristor TH. The capacitor 25 in the circuit prevents undesired triggering of the thyristor TH in case of occurrence of stray or interference peaks, and prevents their application to the control electrode of the thyristor. Capacitor 25 is connected between the gate electrode and the cathode of the thyristor. Resistor 26, in parallel to capacitor 25, prevents response of the protective circuit 11 at excessively high inherent or leakage current of the diac 22 and/or of the thyristor control electrode; effectively, it bleeds off any gate offset current.

After the circuit has responded, it can be reset only by disconnecting the power supply from the rectifier and operating power supply unit 5 or, otherwise, by removing voltage from the supply terminals 1, 2. The thyristor then will revert to blocking condition, and the system is again ready for operation.

Various changes and modifications may be made, and features shown and described in connection with any one of the embodiments may be used with any of the others, within the scope of the inventive concept.

I claim:

1. Protected low-pressure discharge lamp operating circuit, particularly for connection to at least one discharge lamp (3, 3') having
   connection means (1, 2) for connection to a d-c source;
   an oscillatory circuit including
   a ballast inductance (L1, L1') and a capacitor (C1, C1') connected to the at least one lamp, the ballast inductance and the capacitor being interconnected and forming at least one series resonance circuit (4,4') coupled to the respective at least one lamp,
   and two serially connected transistors (T1, T2) of the same conductivity type, connected across the d-c source, and further coupled to said resonance circuit (4,4') to form an oscillatory circuit therewith;
   and a high-voltage disconnect safety circuit (11) including a controlled switching element (TH) connected to at least one of the transistors (T1) in a circuit to block conduction of said at least one transistor upon conduction of said switching element,
   wherein, in accordance with the invention,
   means are provided to deliver operating energy to said switching element (TH) for rendering said switching element conductive when an excessively high voltage is sensed in said circuit, comprising
   a capaictor (C3);
   and a rectifier (D1, D1') connected to the at least one ballast inductance (L1,L1') in the series resonance circuit at a high-tension terminal thereof to derive power from the inductance and provide rectified electrical energy to charge the capacitor (C3) and store said operating energy therein.

2. Circuit according to claim 1, wherein the switching element comprises a thyristor (TH).

3. Circuit according to claim 1, further including a series resistor (18) serially connected in the switching path of said switching element (TH);
and wherein said capacitor (C3) is connected across the series circuit formed by said series resistor (18) and said switching element.

4. Circuit according to claim 1, further including a charge resistor (19) serially connected between the rectifier (D1, D1') and the capacitor (C3).

5. Circuit according to claim 1, further including a voltage divider (20, 21) connected across said capacitor (C3);
and a voltage breakdown element (22) connected to the tap or junction point of the voltage divider and to said switching element and controlling said switching element to conduction if the voltage at said tap or junction point exceeds the breakdown value of said breakdown element (22).

6. Circuit according to claim 5, wherein said switching element comprises a thyristor (TH);
said breakdown element (22) comprises a diac, said diac being connected between the tap or junction point of the voltage divider (20, 21) and the gate electrode of the thyristor.

7. Circuit according to claim 6, further including a capacitor (23) connected between the tap or junction point of the voltage divider and the terminal of said voltage divider connected to the cathode of the thyristor.

8. Circuit according to claim 6, further including a parallel circuit comprising a capacitor (25) and a resistor (26) connected between the gate electrode of the thyristor and the cathode thereof.

9. Circuit according to claim 2, further including a resistor (24) connecting the anode of the thyristor to the positive therminal (1) of the d-c source.

10. Circuit according to claim 1, wherein the switching element is connected across the base of one of said transistors (T1) and the negative terminal (2) of the d-c source to control said one transistor to blocked condition and hence suppress oscillation in the oscillatory circuit.

11. Circuit according to claim 1, wherein a plurality of lamps (1, 1') are connected to said operating circuit;
each one of said lamps has an individual oscillatory circuit (4, 4') associated therewith and connected thereto, each one of said oscillatory circuits including an individual ballast inductance (L1, L1') and an individual capacitor (C1, C1') to form an individual series resonance circuit (4, 4') coupled to the respective one of the lamps (1, 1');
and wherein a plurality of rectifier diodes (D1, D1') are provided, having one terminal, each, connected to a respective one of the ballast inductances (L1, L1') associated with said plurality of lamps, the other terminals of said rectifiers (D1, D1') being commonly connected to said capacitor (C3) to provide charging energy thereto.

12. Circuit according to claim 1, wherein the rectifier diode (D1) is connected to the junction between the ballast inductance (L1) and the capacitor (C1) forming the series resonance circuit.

13. Circuit according to claim 11, wherein said diodes (D1, D1') are connected to the respective junctions between the respective individual ballast inductances (L1, L1') and the associated resonance capacitors (C1, C1').

14. Circuit according to claim 11, wherein the respective lamps and the resonance circuits (4,4') connected thereto are, respectively, connected in parallel to said serially connected transistors (T1, T2).

* * * * *